United States Patent
Fein et al.

(10) Patent No.: US 7,950,143 B2
(45) Date of Patent: May 31, 2011

(54) METHOD FOR CREATING MICRO/NANO WIND ENERGY GATHERING DEVICES

(75) Inventors: Gene S. Fein, Lenox, MA (US); Edward Merritt, Lenox, MA (US)

(73) Assignee: Genedics Clean Energy, LLC, Pittsfield, MA (US)

( * ) Notice: Subject to any disclaimer, the term of this patent is extended or adjusted under 35 U.S.C. 154(b) by 952 days.

(21) Appl. No.: 11/842,441

(22) Filed: Aug. 21, 2007

(65) Prior Publication Data

US 2008/0148549 A1     Jun. 26, 2008

Related U.S. Application Data

(63) Continuation-in-part of application No. 11/627,404, filed on Jan. 26, 2007, now Pat. No. 7,547,984, which is a continuation-in-part of application No. 11/645,109, filed on Dec. 22, 2006, now Pat. No. 7,525,210.

(51) Int. Cl.
    *H05K 3/30* (2006.01)
(52) U.S. Cl. ............. 29/832; 29/592.1; 29/596; 290/55; 310/339
(58) Field of Classification Search ................. 29/592.1, 29/596, 831–833, 854, 729; 290/44, 55; 310/40 MM, 328, 339; 415/4.2, 4.3; 977/840, 977/882

See application file for complete search history.

(56) References Cited

U.S. PATENT DOCUMENTS

| | | |
|---|---|---|
| 3,971,454 A | 7/1976 | Waterbury |
| 4,117,900 A | 10/1978 | Amick |
| 4,119,863 A | 10/1978 | Kelly |
| 4,314,160 A | 2/1982 | Boodman et al. |
| 4,315,402 A | 2/1982 | Sadhukhan |
| RE31,156 E | 2/1983 | Dessert |
| 4,592,136 A | 6/1986 | Hirsch |
| 4,700,081 A | 10/1987 | Kos et al. |
| 4,883,823 A | 11/1989 | Perry et al. |
| 5,075,564 A | 12/1991 | Hickey |

(Continued)

FOREIGN PATENT DOCUMENTS

DE     103 30 601 A1     2/2005

(Continued)

OTHER PUBLICATIONS

Partial International Search Report, PCT/2007/026229, date of mailing Aug. 19, 2009.

(Continued)

*Primary Examiner* — Donghai D. Nguyen
(74) *Attorney, Agent, or Firm* — Hamilton, Brook, Smith & Reynolds, P.C.

(57) ABSTRACT

Method for manufacturing small wind energy gathering devices, for example, of geometrical dimensions tip to $\frac{1}{8}^{th}$ of an inch (microdevices), employing micro-fabrication techniques. For example, three-dimensional single chemical composition parts of a small wind energy gathering device are manufactured using two-photon three dimensional lithography. Preferably, a plurality of such parts are manufactured in parallel, thereby optimizing the production process. The plurality of parts may be handled and assembled using precision instruments such as micro-tweezers, micro-scissors, and holographic lasers. Nanowires may be used to interconnect a plurality of the microdevices together, or to connect components of a particular microdevice. These nanowires are produced in nanowire arrays and are attached to a common base structure. Additionally, a form of injection molding and polymer materials may be utilized in the manufacturing of the small wind energy gathering devices (microdevices), which provide protective coatings and surfaces of reduced friction.

10 Claims, 6 Drawing Sheets

U.S. PATENT DOCUMENTS

| | | | |
|---|---|---|---|
| 5,254,876 A | 10/1993 | Hickey | |
| 5,272,378 A | 12/1993 | Wither | |
| 5,296,746 A | 3/1994 | Burkhardt | |
| 5,606,233 A | 2/1997 | Davis | |
| 5,920,127 A | 7/1999 | Damron et al. | |
| 6,391,205 B1 | 5/2002 | McGinnis | |
| 6,409,467 B1 | 6/2002 | Gutterman | |
| 6,424,079 B1 * | 7/2002 | Carroll | 310/339 |
| 6,624,530 B1 | 9/2003 | Toulon | |
| 6,809,432 B1 | 10/2004 | Bilgen | |
| 6,882,059 B1 | 4/2005 | DePaoli | |
| 6,897,575 B1 | 5/2005 | Yu | |
| 6,927,503 B2 | 8/2005 | Enis et al. | |
| 6,959,993 B2 | 11/2005 | Gross et al. | |
| 6,981,377 B2 | 1/2006 | Vaynberg et al. | |
| 7,098,553 B2 | 8/2006 | Wiegel et al. | |
| 7,127,328 B2 | 10/2006 | Ransom | |
| 7,192,146 B2 | 3/2007 | Gross et al. | |
| 7,193,332 B2 | 3/2007 | Spinelli | |
| 7,199,498 B2 * | 4/2007 | Pinkerton et al. | 310/40 MM |
| 7,226,536 B2 | 6/2007 | Adams | |
| 7,226,542 B2 | 6/2007 | Zemel et al. | |
| 7,339,286 B1 | 3/2008 | Chen | |
| 7,434,636 B2 | 10/2008 | Sutherland | |
| 7,453,164 B2 | 11/2008 | Borden et al. | |
| 2004/0113291 A1 | 6/2004 | Klausner et al. | |
| 2004/0159536 A1 | 8/2004 | Kamen et al. | |
| 2005/0230238 A1 | 10/2005 | Klausner et al. | |
| 2006/0113118 A1 | 6/2006 | Kim | |
| 2006/0137348 A1 | 6/2006 | Pas | |
| 2007/0138797 A1 | 6/2007 | Reidy et al. | |
| 2007/0284885 A1 | 12/2007 | Menges | |
| 2008/0054638 A1 | 3/2008 | Greene et al. | |
| 2008/0148732 A1 | 6/2008 | Fein et al. | |
| 2008/0148733 A1 | 6/2008 | Fein et al. | |
| 2008/0149302 A1 | 6/2008 | Fein et al. | |
| 2008/0149403 A1 | 6/2008 | Fein et al. | |
| 2008/0149573 A1 | 6/2008 | Fein et al. | |
| 2008/0150284 A1 | 6/2008 | Fein et al. | |
| 2008/0150286 A1 | 6/2008 | Fein et al. | |
| 2008/0150288 A1 | 6/2008 | Fein et al. | |
| 2008/0150289 A1 | 6/2008 | Fein et al. | |
| 2008/0150290 A1 | 6/2008 | Fein et al. | |
| 2008/0150291 A1 | 6/2008 | Fein et al. | |
| 2008/0150295 A1 | 6/2008 | Fein et al. | |
| 2008/0150296 A1 | 6/2008 | Fein et al. | |
| 2008/0150298 A1 | 6/2008 | Fein et al. | |
| 2008/0152492 A1 | 6/2008 | Fein et al. | |
| 2008/0154800 A1 | 6/2008 | Fein et al. | |
| 2008/0154801 A1 | 6/2008 | Fein et al. | |
| 2008/0163919 A1 | 7/2008 | Fein et al. | |
| 2008/0196758 A1 | 8/2008 | McGuire | |

FOREIGN PATENT DOCUMENTS

| | | |
|---|---|---|
| EP | 1 519 041 A1 | 3/2005 |
| EP | 1 681 462 A2 | 7/2006 |
| NL | 1 016 526 C1 | 5/2001 |
| WO | WO 2005/003553 | 1/2005 |
| WO | WO 2006/121414 A | 11/2006 |
| WO | WO 2006/138516 A | 12/2006 |
| WO | WO 2008/079369 | 7/2008 |
| WO | WO 2008/115479 A2 | 9/2008 |
| WO | WO 2008/118321 A2 | 10/2008 |
| WO | WO 2008/136901 A2 | 11/2008 |

OTHER PUBLICATIONS

Holmes, Andrew S., et al., "Axial-Flux Permanent Magnet Machines for Micropower Generation," Journal of Microelectrical Systems, vol. 14, No. 1, Feb. 2005.

Zhong Lin Wang and Jinhui Song, "Piezoelectric Nanogenerators Based on Zinc Oxide Nanowire Arrays," Science, vol. 312, Apr. 14, 2006.

www.metropolismag.com, 6 pages, retrieved from Internet Apr. 19, 2007.

www.greencarcongress.com, 4 pages, retrieved from Internet Apr. 19, 2007.

www.panasonic.co.jp, 8 pages, retrieved from Internet Jan. 26, 2007.

Bourouni, K., et al., Experimentation and Modelling of an Innovative Geothermal Desalination Unit, *Desalination 125*, pp. 147-153 (Nov. 9-12, 1999).

Tzen, E., et al., "Renewable Energy Sources for Desalination," *Solar Energy 75*(5), pp. 375-379 (Nov. 1, 2003).

Garcia-Rodriguez, L., "Seawater Desalination Driven by Renewable Energies: A Review," *Desalination 143*(2), pp. 103-113 (May 20, 2002).

Kalogirou, S.A., "Seawater Desalination Using Renewable Energy Sources," *Progress in Energy and Combustion Science 31*(3), pp. 242-281 (Jan. 1, 2005).

Belessiotis, V., et al., "The History of Renewable Energies for Water Desalination," *Desalination 128*, pp. 147-159 (2000).

Awerbuch, L., et al., "Geothermal Energy Recovery Process," *Desalination 19*, pp. 325-336 (1976).

International Search Report for PCT/us2008/006034, date of mailing Oct. 24, 2008.

International Search Report for PCT/US2008/003603, date of mailing Oct. 31, 2008.

* cited by examiner

METHOD FOR CREATING MICRO/NANO WIND ENERGY GATHERING DEVICES

RELATED APPLICATIONS

This application is a continuation-in-part of U.S. application Ser. No. 11/627,404, filed Jan. 26, 2007, now issued as U.S. Pat. No. 7,547,984 which is a continuation-in-part of U.S. application Ser. No. 11/645,109, filed Dec. 22, 2006, now issued as U.S. Pat. No. 7,525,210. The entire teachings of the above applications are incorporated herein by reference.

BACKGROUND OF THE INVENTION

It is well known that wind power turbines can generate power that can be delivered via interconnection to existing grid systems or can be used to power individual homes, businesses, and utilities. Most, if not all, wind power systems that are used to gather large amounts (in the megawatt range) of power are large-structure wind turbines, many of which are at least one-hundred feet high. In the past, smaller wind powered turbines have also been placed high up from the ground, usually at least fifteen feet high. Additionally, most smaller wind power turbine systems are utilized to power a single home, business, or components of that home or business.

Currently, large wind installations (e.g., one-hundred feet or greater) dot the landscape of the planet. These turbines are often positioned in remote fields, out to sea, or on private property away from public infrastructure. Smaller wind turbine installations (e.g., five to thirty feet) and other energy gathering devices are typically utilized in three deployments. The first deployment features clusters of small to mid-sized turbines set up in remote windy areas such as the desert environment near Palm Desert, Calif. The second deployment features isolated powering of small homes and businesses, such as those in remote arctic or other extremely cold climates where heating and cooling infrastructure do not exist, or are augmented at the micro-use level for a single home or business. The third deployment features isolated powering of entities for government utilities, such as the isolated powering of single light stands at the Hanauma Bay National Park public parking lot in Oahu, Hi.

Conventional models can address power plant or isolated-use situations for the generation and distribution of wind power. Large turbines generate megawatt volumes of power to be utilized locally or interconnected back to a grid system. Smaller wind energy gathering systems are typically used to solve local power issues, such as street lights, home, or business needs. Smaller wind energy gathering systems can also be interconnected to a grid system for the purpose of selling the power that is generated by the system to a public or private utility.

SUMMARY OF THE INVENTION

Existing conventional uses of wind turbines have certain limitations in distribution and deployment, and large turbines have faced environmental and Defense Department concerns. Environmentalists fear that the noise and size of turbines will disrupt both scenic and habitat conditions in addition to threaten the well being of birds that may be caught in the large turbine blades. The Department of Defense has raised concerns over the possible interference of the large turbines with radar signals and tracking. Large turbine systems that are placed far away from existing infrastructure also incur a large expense in the transportation or building of infrastructure to carry the power generated by the turbine system. Finally, the large turbine system represents a major, volatile investment for a single turbine. If wind is not present or wind currents change, then the turbine would be viewed as a poor investment because it will not generate enough power to be profitable. Furthermore, if the turbine breaks for any reason, it will produce zero power as it is a large and single entity. Large turbines also require labor intensive maintenance and monitoring. The life cycle for large wind turbines is about twenty years, and decommissioning the large wind turbine is yet another environmental issue with which must be contended.

Small wind power utilized in isolated areas and for private homes, businesses, or individual use is a great way to introduce clean energy on a unit-by-unit grass roots level. As such, the present invention provides a method and system for very small, noiseless to low-noise wind turbines for the purposes of creating energy to meet both small and large power demands. It should be noted that small wind power turbines are inefficient to install individually once they reach a certain decreasing size, therefore, the turbines may be mounted on a single sheet of installable material that may be loosely rolled or stacked in sheets to protect the integrity of the turbines and allow for large areas of sheeted turbines to be rolled out and efficiently installed. The power generated by the very small wind turbines can be sent to existing electrical grids or to residential homes, businesses, or systems without connecting to the existing grids.

The present invention provides a solution to the problems of the prior art by providing a method and system for an fabricating small wind turbine power devices, including small wind energy gathering devices, that can then be easily connected to multiple direct sources or various grid interconnection points. Components of these very small wind turbines, such as the tiny wiring from turbines forming a tiny wiring grid, with wind turbines on the micrometer scale together, have been shown to have superconductive properties which may help increase the energy gathering efficiency of tiny wind turbines. Further, wind energy gathering devices on the nano- and micrometer scale of up to about $1/8^{th}$ of an inch may be made with advanced lithography and laser tools, and wind energy gathering devices $1/8^{th}$ of an inch in size and up can be made via standard molding and forming processes. Also, the use of tiny wind turbines allows for deployment of billions of turbines in spaces where larger turbines could not fit, such as curved guardrails, on top of vehicles and mounted vertically or horizontally in positions that would not be functional for larger turbines. The functions of the tiny turbines is wide ranging, from generating heat with their energy by affixing them to winter jackets and gloves to rolling out large strips of installable sheets of tiny turbines for use of public and private highways via median and outside of breakdown lane installations of small wind gathering devices offers numerous advantages. First, private highways and municipalities have existing maintenance crews as well as existing relationships with contracted infrastructure building providers who can be trained to install the wind generation systems along specified parts of roadways. Second, the wind power generation systems can be small and noiseless, small enough to fit millions or billions of tiny turbines on a median between opposite sides of a divided highway with existing median. Third, the energy generated by the devices may be distributed directly to homes or businesses along the highway route, such as powering homes or clean power for the electrolysis of hydrogen for filling stations along a highway, either utilizing hydrogen conversion at individual filling stations or at a conveniently located hydrogen conversion plant adjacent to the highway or roadway. Fourth, other clean energy sources such as solar, geothermal and other heat conversion technologies may be used to create a multi-source clean energy "power grid" along with or in tandem with the "grid" in place via potential for the connection of miles of wind power gathering, storage and transfer of generated power. Fifth, these infrastructures benefit the wind power generator companies; the roadway owners via lease or easement revenue, any product that could benefit from an easily installed "skin" or sheet of the tiny turbine energy gathering material, as well as provide a stable and consistent infrastructure project generating a service provider economy for clean energy production as well as the environment. Sixth, roadways are a consistent source of wind and by having small wind energy capture gathering devices close to the ground the wind energy capture devices, such as small noiseless spiral or helix-style turbines, enable the devices to capture wind energy generated by passing vehicles as well as existing currents. Seventh, the power generated by this system may also be connected to a grid system at many different and convenient points located very close to the existing grid infrastructure.

The wind energy gathering microdevices of the present invention may be designed, manufactured, and tested using tools, technology, and skills that are currently being employed in other areas of industry. According to one embodiment of the present invention, a method of fabricating a wind energy gathering microdevice includes producing components of the wind energy gathering microdevice using three-dimensional lithography and producing at least one array of nanowires. The components and nanowires are manipulated using optical cutting lasers and optical trapping lasers, and assembled to form the wind energy gathering microdevice.

Producing the components of the wind energy gathering microdevice may include producing a microturbine and at least one magnet, which may be attached to the microturbine. Further, the microturbine may be configured to rotate around a longitudinal axis of the microturbine to cause the at least one micro-magnet to move along a circular path. Producing at least one array of nanowires may include growing the nanowires from a metallic substrate, and manipulation of the microcomponents may include separating the nanowires from the metallic substrate using optical cutting lasers, and moving the nanowires using optical trapping lasers.

Assembling the components of the wind energy gathering microdevice may include incorporating at least a first nanowire into the microturbine and configuring the at least first nanowire to harness an electrical flow upon movement of the at least one magnet. Additionally, at least a second nanowire may be coupled to the microturbine component, and configured to transfer the harnessed electrical flow away from the micro-turbine and at least first nanowire.

It should be noted that producing and assembling the components of the wind energy gathering microdevice may include producing and assembling a plurality of components in parallel, and may include mounting the wind energy gathering microdevice(s) on a sheet with a plurality of other wind energy gathering microdevices. Additionally, the components, the wind energy gathering microdevice, or the sheet of wind energy gathering microdevices may be tested for durability.

According to yet another embodiment of the present invention, a system for fabricating a wind energy gathering microdevice includes a production module that produces components of the wind energy gathering microdevice using three-dimensional lithography, at least one array of nanowires, at least one optical cutting laser, at least one optical trapping laser to manipulate the components and nanowires, and an assembly module that assembles the components and nanowires to form the wind energy gathering microdevice.

The components may include a microturbine and at least one magnet, which may be attached to the microturbine. The microturbine may be configured to rotate around a longitudinal axis of the microturbine to cause the at least one magnet to move along a circular path.

The nanowire array(s) may be grown from and, therefore, attached to a metallic substrate, and system may include a separation module that separates the nanowires from the metallic substrate using the at least one optical cutting laser, and may include a manipulation module that manipulates the components and nanowires using the at least one optical trapping laser.

The system may incorporate at least a first nanowire into the microturbine and configure the first nanowire(s) to harness an electrical flow upon movement of the microturbine and magnet(s). Additionally, at least a second nanowire may be coupled to the microturbine component and configured to transfer the harnessed electrical flow away from the microturbine and first nanowire(s).

It should be noted that the production and assembly modules may produce and assemble a plurality of components in parallel, and the system may include a mounting module that mounts a plurality of the wind energy gathering microdevices on a sheet. Additionally, the system may include a testing module that tests the components, the wind energy gathering microdevice, and the sheet of wind energy gathering microdevices for durability.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

"Wind" as used herein refers to both wind created by the movement of vehicles (hereinafter also "dirty wind") and atmospheric wind.

Figure 1:
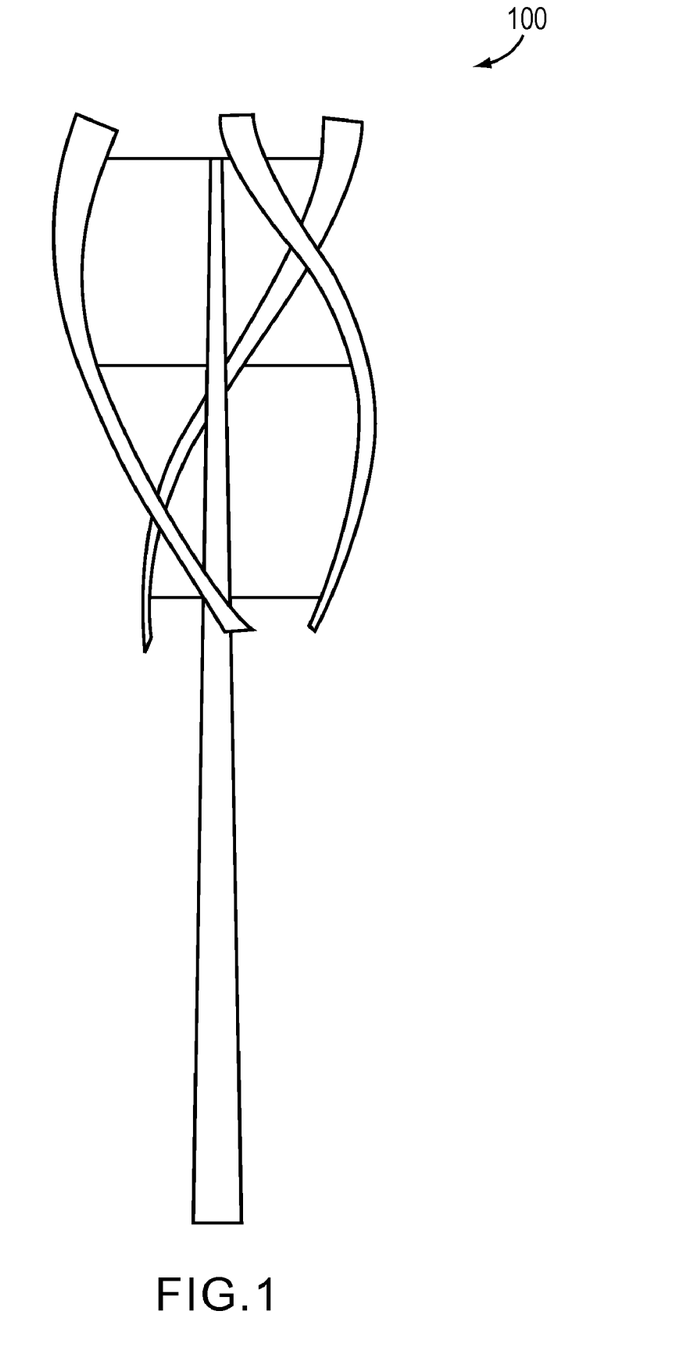
FIG. 1 is a schematic drawing of wind turbine generator.

A "wind energy gathering device" as used herein, is a device that converts wind energy into electrical energy. Wind energy gathering devices may include one or more "wind turbine generators." A "wind turbine generator" (also "wind turbine" as referred to herein) is a device that includes a turbine and a generator, wherein the turbine gathers or captures wind by conversion of some of the wind energy into rotational energy of the turbine, and the generator generates electrical energy from the rotational energy of the turbine. An example wind turbine generator is illustrated in FIG. 1. These wind turbine generators 100 can employ a turbine rotating around an axis oriented in any direction. For example, in a "horizontal axis turbine," the turbine rotates around a horizontal axis which is oriented, typically, more or less parallel to the ground. Furthermore, in a "vertical axis turbine," the turbine rotates around a vertical axis, which is oriented, typically, more or less perpendicular to the ground. For example, a vertical axis turbine can be a Darrieus wind turbine, a Giromill-type Darrieus wind turbine, a Savonius wind turbine, a propeller style turbine, a "helix-style turbine," and the like. In a helix style turbine, the turbine blades are helically shaped and rotate around a vertical axis. A helix style turbine can have a single-helix design or multi-helix design, for example, double-helix, triple-helix or quad-helix design. Helix style wind turbine generators are not dependent on single direction wind, which is good because wind often comes in uneven and multiple directions, or even in cross directions. Wind energy generating devices can have geometrical dimensions from about several nanometers to about several hundred feet. Wind energy gathering devices on the nano- to micrometer scale may include one or more nano- and/or microwires of one or more materials that show a strong piezoelectric effect, for example, zinc oxide, that substitute for the above discussed turbine and generator. These nano- and microwires can gather wind energy and generate electricity, thus, substituting the function of the above discussed turbines and generators. It is believed, that each wire mechanically deforms, for example, bends in response to wind, thereby converting some of the wind energy into electrical energy via a piezoelectric effect.

The "ground" as used herein is the surface to which the wind energy gathering device is attached, for example, literally earth's ground, a road surface, a road sign, the surface of a road noise barrier, a tunnel surface, the surface of a wind energy gathering sheet, the surface of a car and the like.

The "height" of a wind energy gathering device or wind turbine generator as used herein, is the height measured perpendicularly from the ground adjacent to the device or generator to the highest point of the device or generator. Wind energy gathering devices can have a height between about a few micrometers and several hundred feet. Wind energy gathering devices of very small geometrical dimensions and wind energy gathering sheets employing wind energy gathering devices of very small geometrical dimensions, for example, on the nanometer and micrometer scale, may be manufactured using microfabrication methods.

Microfabrication methods for three-dimensional structure creation are well known in the art and include, for example, photolithography such as two-photon three-dimensional lithography, etching such as RIE (Reactive-ion etching) or DRIE (Deep reactive-ion etching), thin film deposition such as sputtering, CVD (Chemical Vapor Deposition), evaporation, epitaxy, thermal oxidation, doping using for example thermal diffusion or ion implantation, wafer-scale integration techniques, wafer bonding, CMP (Chemical-Mechanical Planarization), wafer cleaning, nano- and micrometer scale wiring fabrication, and the like. Materials suitable for microfabrication methods include, for example, silicon (e.g., single crystal silicon), silicon carbide, and silicon/silicon carbide hybrid structures. Materials for nano- and micrometer scale wiring fabrication include, for example, gold, silicon, copper, silver and zinc oxide.

Figure 2:
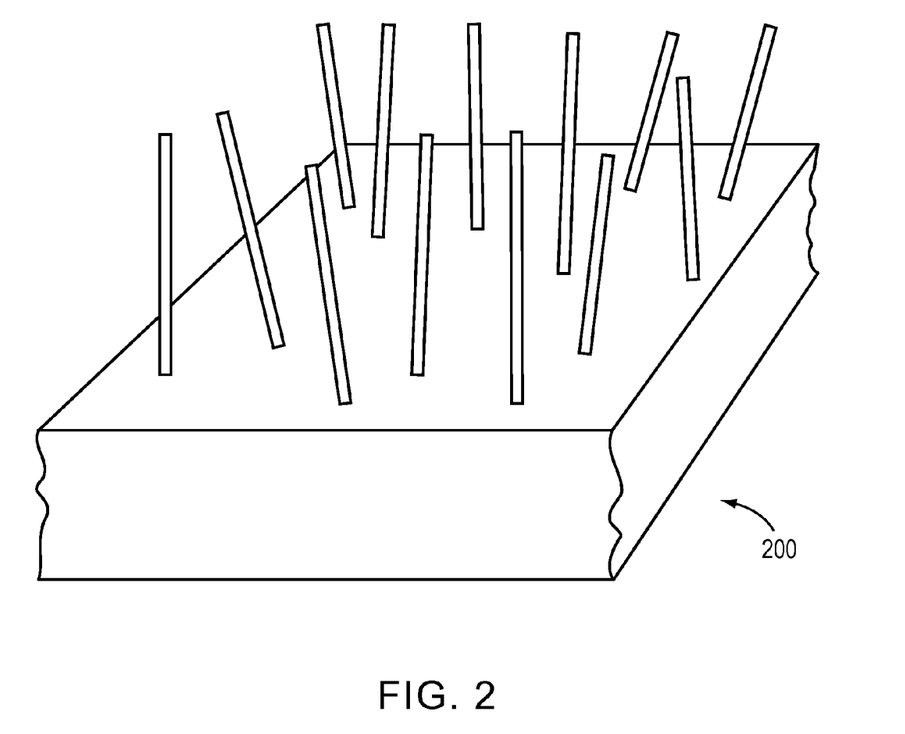
FIG. 2 is a schematic drawing of an array of nanowires.

"Piezoelectric nanowires" as used herein are crystalline wires that exhibit a piezoelectric effect upon mechanical deformation or pressure, for example, bending and release of same mechanical deformation or pressure. An example of a suitable material is zinc oxide. These wires can be manufactured using methods known in the art. An example array of these nanowires is illustrated in FIG. 2. Typically, these nanowires 200 have length that is about 5 to 20 times the width, depth, or radius of the nanowires 200. Also, typically, nanowires 200 may have lengths of between about 100 nanometer and a few micrometers and widths, depths, or radii of between about 5 nanometer and about 200 nanometers.

Parts of or entire wind energy gathering devices with dimensions of about ⅛th of an inch and up can be manufactured, for example, using molding technology known in the art. All of the wind energy gathering devices, but, in particular, the ones of dimensions of about ⅛th of an inch and up may replicate the well known designs of larger, that is, 5 feet to several hundred feet wind energy gathering devices, for example, helical wind turbines. These designs of larger wind energy gathering devices typically include elements such as charging controllers, automatic lubrication systems, artificial loads and the like to optimize performance of the wind energy gathering device.

Wind energy gathering sheets (hereinafter also "wind turbine installation sheets" or "wind turbine installation placards") are wind energy gathering devices that employ a plurality, for example, up to millions or billions of nano- and/or micrometer scale wind energy gathering devices on a sheet with a density of, typically, about 1500 to about a million wind energy gathering devices per square meter of sheet. Sheets may be rigid or flexible and may provide the housing and infrastructure for wiring of the wind energy gathering devices and for connective wiring to other wind energy gathering sheets, to an inverter or battery system. Wind energy gathering sheets may also employ one or more smaller wind energy gathering sheets.

Nano- and/or micrometer scale wind energy gathering devices on wind energy gathering sheets can be manufactured directly on a given sheet and/or the wind energy gathering devices can be, independently, manufactured and than attached to a given sheet. Wiring that may be used to electrically interconnect the wind energy gathering devices and/or the wind energy gathering devices with electric circuitry on a given sheet includes, for example, nano- and micrometer scale wiring as known in the art, for example, gold, silicon, copper and silver nano- and micrometer scale wires.

Wind energy gathering devices of geometrical dimensions up to ⅛th of an inch (microdevices) can be produced by using micro-fabrication methods. Three-dimensional single-component or multi-component parts of the wind energy gathering device can be manufactured, for example, using two-photon three-dimensional lithography, such as Focal Point Technology. Single-component and multi-component parts arc parts that consist of one chemical composition, which is processed by the three-dimensional lithography technology. Examples of three-dimensional lithography technology capable of producing multi-component parts include products and services provided by Focal Point Micro Systems® (see, www.fpmicro.com). Preferably, the microdevices, or microdevice components, are made of a material that is suitable for both Focal Point Technology and for wind turbine applications.

Preferably, the method is used to manufacture a plurality of a given single-component or multi-component parts in parallel, thereby optimizing the production process. By applying a sheeted concept to the manufacturing of the microdevices, the microdevices may be wired, manufactured, and deployed in sheets, enabling wiring grids to be laid down in the manufacturing process along with micro/nano calibrated stampers, pressers, and scissors to produce large sheets of microdevices in a single manufacturing process. Pressing sheets of turbines in a multi-stage process of assembly makes the process of making millions of microdevices a swift process.

The plurality of one-component parts may be manipulated and assembled using precision instruments such as micro-tweezers (optical trapping lasers), micro-scissors (optical cutting lasers), and holographic lasers. The precision laser instruments are capable of accurately handling objects on a micro/nano scale. Examples of such precision laser instruments include products offered by Arryx® (see, www.arryx.com). The tiny components produced using the focal point technology may then be manipulated by the precision laser instruments to be assembled into the wind energy gathering microdevice. If a large number of the tiny components are produced in parallel, then many of precision laser instruments may be used to manipulate the many components in parallel.

Individual components of the microdevices, or the entire microdevices, may be made of a durable polymer based material. Examples of such materials include materials manufactured by DSM® (see, www.dsm.com). The durability of the microdevices, or microdevice components, may be tested utilizing a durability testing process. Example testing process include processes performed by FEI Company® (see, www.fei.com). Testing may involve individual components of the microdevices, the microdevice as a whole, or an entire sheet of microdevices. An example testing process may include subjecting a wind energy gathering microdevice (or sheet of microdevices) to a breeze of a certain MPH strength, and determining that a certain amount of electricity is generated based upon the proper functioning of the microdevice, or sheet of microdevices. It should be noted that wind tests will be conducted to ensure that the devices can withstand wind speeds of up to 150 MPH, and that defective sheets will be recycled. A cleaning test process may subject the wind energy gathering microdevice (or sheet of microdevices) to dirt and petroleum mixed impurities which are then blown and washed from the microdevice (or sheet of microdevices). The cleaning test process may be repeated numerous times to determine stress levels appropriate with a multi-year installation. Specific sizes of the microdevices may be varied to match the stress levels and installation duration necessary for a successful installation, as certain size microdevices or microdevice sheets may be more effective and prudent in certain conditions than others.

Nanowires may be used to interconnect a plurality of the microturbines together, or to connect components of a particular microturbine. These nanowires are produced in nanowire arrays, a plurality of which are attached to a common base structure. Utilizing the micro-scissors and micro-tweezers discussed above, the nanowires may be detached from the common base structure using the micro-scissors and manipulated using the micro-tweezers when incorporating the nanowires into the microdevices, or sheet of microdevices. Preferably the nanowires would be made of copper, but other metals capable of conducting electricity may be used, such as silver. The nanowires may be coated with a polymer for purposes of insulation and to prevent deterioration caused by adverse weather conditions. Using the polymer or similar set of materials to fabricate the microdevices and to coat the nanowires makes the microdevices washable and protects the integrity of the electrical flow.

Additionally, wind energy gathering devices of geometrical dimensions of $1/8^{th}$ of an inch and up may be manufactured. These devices may resemble the wind energy gathering devices made by Oy Windside Production Ltd.® (see, www.windside.com). The smallest wind energy gathering devices made by Windside® are typically about five feet; however, according to the principles of the present invention, smaller versions of these devices may be manufactured using a form or injection molding process.

It should be noted that some parts of the Windside® devices either cannot or should not be miniaturized, such as any microprocessors present in the devices; but these parts are already small enough such that they may be included in the tiny wind devices without needing to be miniaturized. Additionally, some parts of the Windside® devices require lubrication to prevent wear and damage. The tiny devices of the present invention, however, do not need lubrication as the polymer itself is a slippery material that creates very little friction, similar to the material of Teflon®.

In addition, harnessing a force known as the Casimir force may enable the microdevices to operate with little or no friction. The Casimir force was discovered in 1948 and first measured in 1997, and can be observed in a gecko's ability to stick to a surface with just one toe. Reversing the Casimir force causes an object to repel rather than attract another object. Applying this reverse Casimir force to embodiments of the present invention would reduce friction in the microturbines and allow the microdevice to operate more efficiently.

Figure 3A:
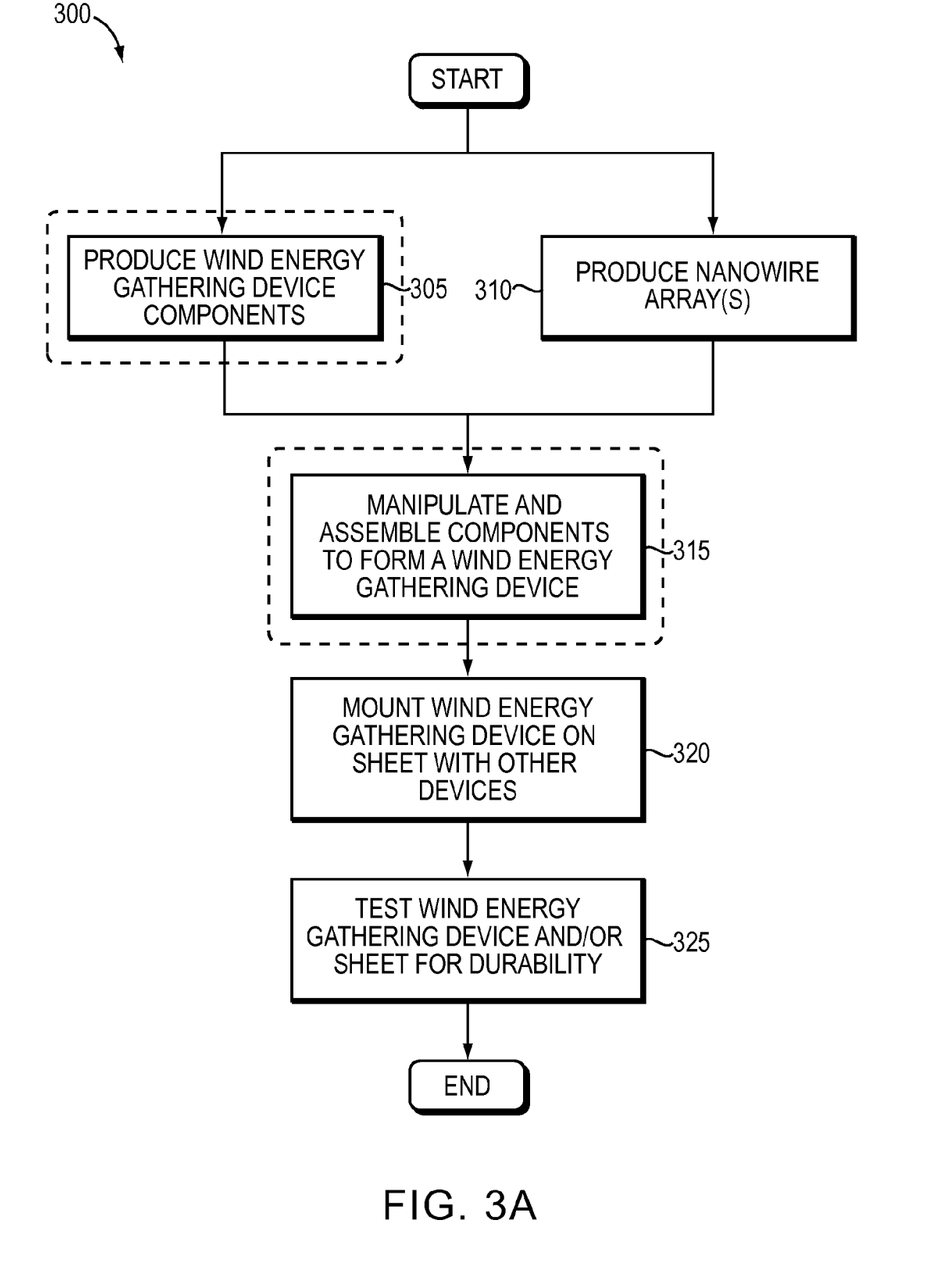
FIGS. 3A-3C are flow diagrams illustrating a method of fabricating wind energy gathering microdevices.
Figure 3B:
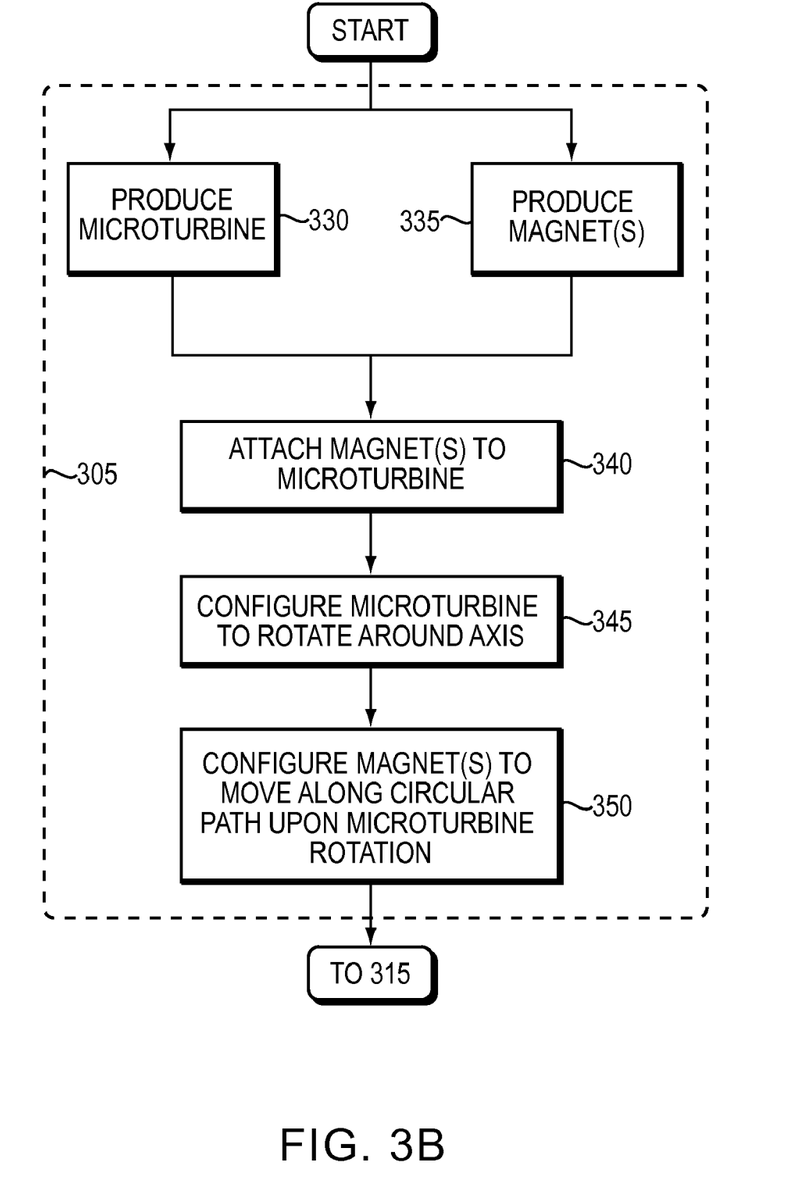
Figure 3C:
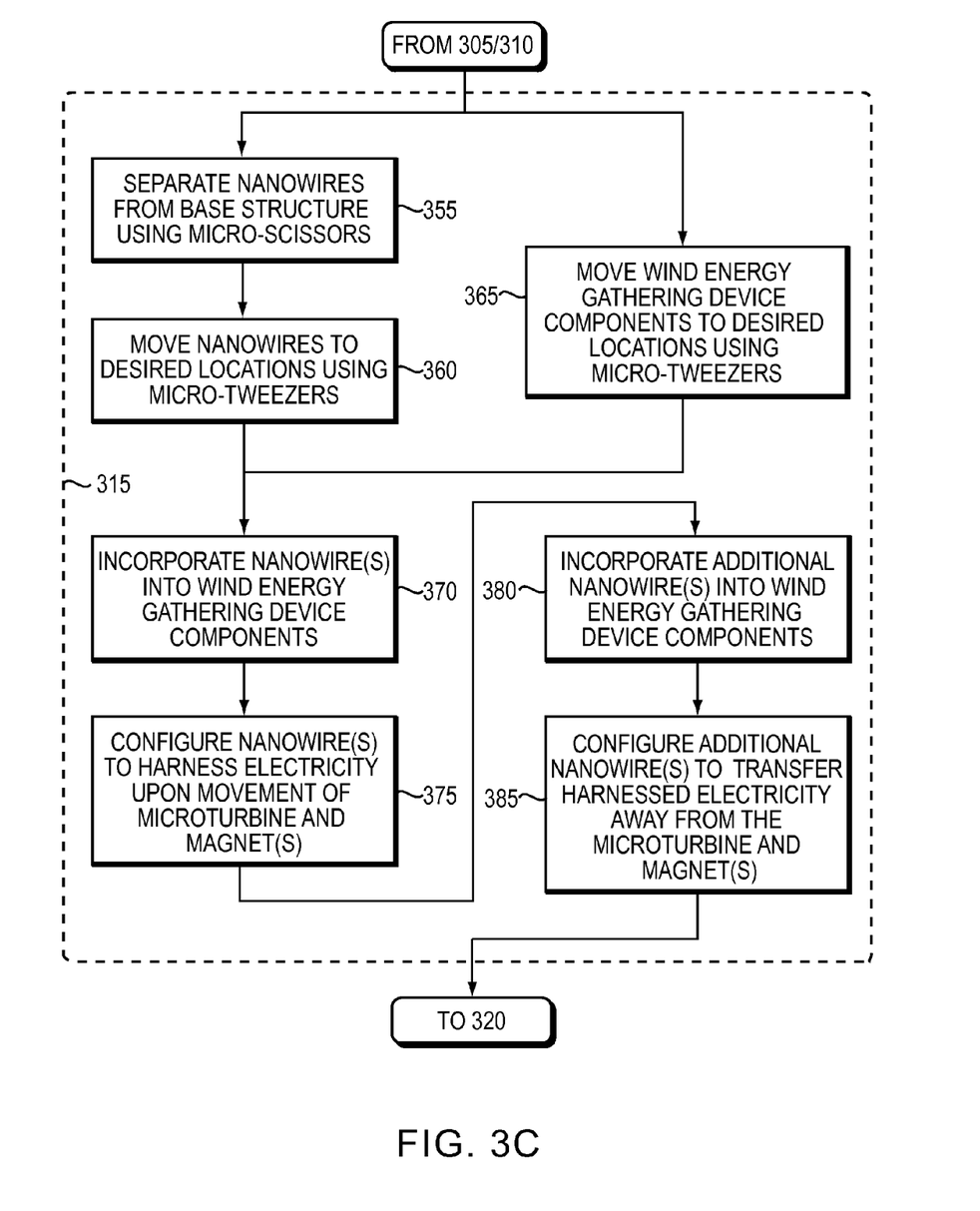

FIGS. 3A-3C are flow diagrams illustrating a method of fabricating wind energy gathering microdevices, according to an embodiment of the present invention. According to the example embodiment, and referring to FIG. 3A, components of wind energy gathering microdevices are produced (305), as well as at least one array of nanowires (310). Referring to FIG. 3B, production of the microdevices components may include producing a microturbine (330) and at least one magnet (335). The magnet(s) may then be attached to the microturbine (340). The microturbine may then be configured to rotate around its axis (345) and the magnet(s) configured to move along a circular path upon rotation of the microturbine (350). Returning to FIG. 3A, the components and nanowires are then manipulated and assembled to form a wind energy gathering microdevice (315).

Referring to FIG. 3C, the assembly of a wind energy gathering microdevice may include separating nanowires form their respective nanowire array base structure using at least one micro-scissor (355) and moving the separated nanowires to a desired location using at least one micro-tweezer (360). At this time, the components of the wind energy gathering microdevice may also be moved to a desired location using at least one micro-tweezer (365). Assembly of the wind energy gathering microdevice may further include incorporating at least one nanowire into the microturbine/magnet(s) components (370) and configuring the nanowire(s) to harness electricity upon rotational movement of the microturbine/magnet(s) components (375). Additional nanowires may be incorporated into the components (380) and configured to transfer the harnessed energy away from the components (385). Returning to FIG. 3A, the assembled wind energy gathering microdevice may be mounted on a sheet with other wind energy gathering microdevices (320) and tested for durability (325).

Figure 4:
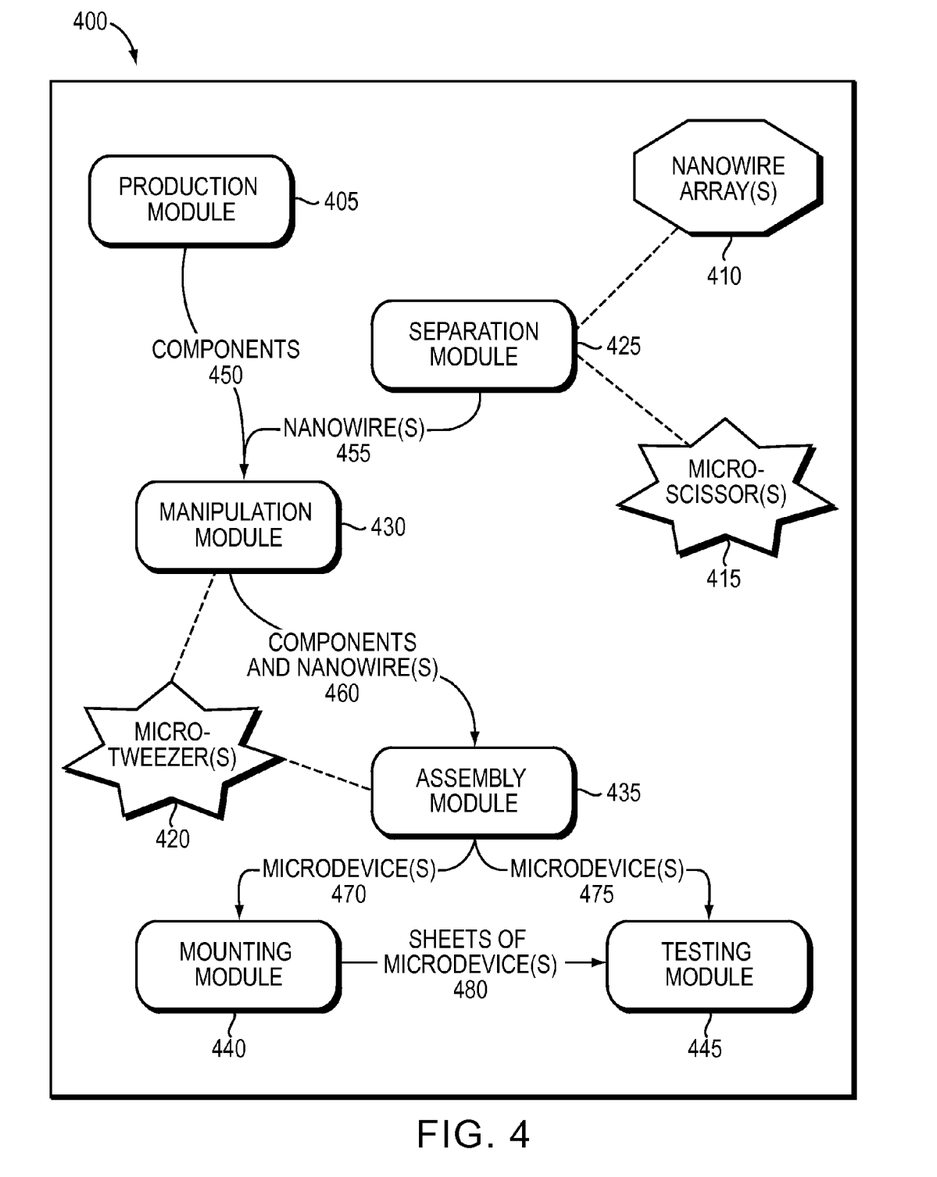
FIG. 4 is a block diagram illustrating a system for fabricating wind energy gathering microdevices.

FIG. 4 is a block diagram illustrating a system for fabricating wind energy gathering microdevices, according to an embodiment of the present invention. The example system 400 includes a production module 405, at least one nanowire array 410, at least one micro-scissor, 415, at least one micro-tweezer 420, a separation module 425, a manipulation module 430, an assembly module 435, a mounting module 440, and a testing module 445. The production module 405 produces a number of wind energy gathering microdevice components 450. The separation module 425 uses a number of micro-scissors 415 to separate a number of nanowires 455 from at least one nanowire array 410. The manipulation module 430 controls and moves the components 450, 460 and nanowires 455, 460 using a number of micro-tweezers 420 to the assembly module 435, where the components 450, 460 and nanowires 455, 460 are assembled into wind energy gathering microdevices 470, 475. From the assembly module 435, the wind energy gathering microdevices 470 may be mounted on a sheet by the mounting module 440. The microdevices 475 (or sheet of microdevices 480) may then be tested for durability by the testing module.

While this invention has been particularly shown and described with references to example embodiments thereof, it will be understood by those skilled in the art that various changes in form and details may be made therein without departing from the scope of the invention encompassed by the appended claims.

What is claimed is:

1. A method of fabricating a wind energy gathering microdevice, the method comprising:
   producing micro-components of the wind energy gathering microdevice using three-dimensional lithography;
   producing at least one array of nanowires;
   manipulating the micro-components and nanowires using optical cutting lasers and optical trapping lasers;
   assembling the micro-components of the wind energy gathering micro-device and nanowires, the nanowires electrically interconnect the micro-components to form the wind energy gathering microdevice.

2. A method as in claim 1 wherein producing micro-components of the wind energy gathering microdevice includes producing a microturbine and at least one magnet.

3. A method as in claim 2 further comprising:
   attaching the at least one magnet to the microturbine; and
   configuring the microturbine to rotate around a longitudinal axis of the microturbine to cause the at least one magnet to move along a circular path.

4. A method as in claim 3 wherein assembling the micro-components of the wind energy gathering microdevice includes incorporating at least a first nanowire into the microturbine and configuring the at least first nanowire to harness an electrical flow upon movement of the at least one magnet.

5. A method as in claim 4 wherein assembling the micro-components of the wind energy gathering microdevice includes coupling at least a second nanowire to the microturbine component, and configuring the at least second wire to transfer the harnessed electrical flow away from the microturbine and at least first nanowire.

6. A method as in claim 1 wherein producing the at least one array of nanowires includes growing the nanowires from a metallic substrate.

7. A method as in claim 6 wherein manipulating the micro-components includes separating the nanowires from the metallic substrate using optical cutting lasers, and moving the nanowires using optical trapping lasers.

8. A method as in claim 1 wherein producing and assembling the micro-components of the wind energy gathering microdevice includes producing and assembling a plurality of components in parallel.

9. A method as in claim 1 further comprising mounting the wind energy gathering microdevice on a sheet with a plurality of other wind energy gathering microdevices.

10. A method as in claim 1 further comprising testing the micro-components, the wind energy gathering microdevice, and the sheet of wind energy gathering microdevices for durability.

* * * * *